(12) United States Patent
Ueda

(10) Patent No.: US 9,020,329 B2
(45) Date of Patent: Apr. 28, 2015

(54) SIGNAL PROCESSING DEVICE

(71) Applicant: Panasonic Intellectual Property Management Co., Ltd., Osaka-shi (JP)

(72) Inventor: Hisataka Ueda, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 44 days.

(21) Appl. No.: 13/773,652

(22) Filed: Feb. 22, 2013

(65) Prior Publication Data

US 2013/0236156 A1    Sep. 12, 2013

(30) Foreign Application Priority Data

Mar. 6, 2012 (JP) .................. 2012-048757
Dec. 3, 2012 (JP) .................. 2012-264525

(51) Int. Cl.
*G11B 27/00* (2006.01)
*H04N 5/93* (2006.01)
*H04N 9/79* (2006.01)
*G11B 27/034* (2006.01)
*G11B 27/36* (2006.01)

(52) U.S. Cl.
CPC ............... *H04N 9/79* (2013.01); *G11B 27/034* (2013.01); *G11B 27/36* (2013.01)

(58) Field of Classification Search
USPC .................................... 386/278, 230
See application file for complete search history.

(56) References Cited

U.S. PATENT DOCUMENTS

2004/0179816 A1    9/2004   Takehana
2012/0201517 A1*   8/2012   Sakuragi et al. .............. 386/278

FOREIGN PATENT DOCUMENTS

JP    2004-274627 A    9/2004

* cited by examiner

*Primary Examiner* — Thai Tran
*Assistant Examiner* — Girumsew Wendmagegn
(74) *Attorney, Agent, or Firm* — Shinjyu Global IP

(57) ABSTRACT

The present signal processing device includes an operating unit, an editing database, a conflict detection unit and a conflict display unit. The operating unit is configured to output a plurality of pieces of editing result information and a single or plurality of editing IDs identifying pieces of result information in association with each other. The editing database holds the plurality of pieces of editing result information and the single or plurality of editing IDs in association with each other. The conflict detection unit detects a difference between or differences among the plurality of pieces of editing result information associated with the same editing ID as a single or plurality of conflict states based on the plurality of pieces of editing result information and the single or plurality of editing IDs to be obtained from the editing database. The conflict display unit displays the single or plurality of conflict states.

7 Claims, 8 Drawing Sheets

| No. | Clip ID | Start Time | Duration |
|---|---|---|---|
| 1 | C1 | 00:00:10:00 | 00:00:20:00 |
| 2 | C1 | 00:01:10:00 | 00:00:30:00 |
| 3 | C1 | 00:03:10:00 | 00:00:30:00 |
| 4 | C2 | 00:04:10:00 | 00:00:30:00 |

FIG. 3

| No. | Clip ID | Start Time | Duration |
|---|---|---|---|
| 1 | C1 | 00:00:10:00 | 00:00:20:00 |
| 2 | C1 | 00:01:15:00 | 00:00:30:00 |
| 3 | C1 | 00:02:10:00 | 00:00:30:00 |
| 4 | C1 | 00:03:10:00 | 00:00:30:00 |

SECOND PLAYLIST EXAMPLE

| No. | Clip ID | Start Time | Duration |
|---|---|---|---|
| 1 | C1 | 00:00:10:00 | 00:00:20:00 |
| 2 | C1 | 00:01:15:00 | 00:00:30:00 |
| 3 | C1 | 00:02:10:00 | 00:00:30:00 |
| 4 | C1 | 00:03:10:00 | 00:00:30:00 |

FIRST PLAYLIST EXAMPLE

| No. | Clip ID | Start Time | Duration |
|---|---|---|---|
| 1 | C1 | 00:00:10:00 | 00:00:20:00 |
| 2 | C1 | 00:01:10:00 | 00:00:30:00 |
| 3 | C1 | 00:03:10:00 | 00:00:30:00 |
| 4 | C2 | 00:04:10:00 | 00:00:30:00 |

| Thumb | Clip ID: C1<br>Start Time: 00:00:10:00<br>Duration: 00:00:20:00 |
| --- | --- |
| Thumb | Clip ID: C1<br>Start Time: 00:01:10:00<br>Duration: 00:00:30:00 |
| Thumb | Clip ID: C1<br>Start Time: 00:02:10:00<br>Duration: 00:00:30:00 |
| Thumb | Clip ID: C1<br>Start Time: 00:03:10:00<br>Duration: 00:00:30:00 |
| Thumb | Clip ID: C2<br>Start Time: 00:04:10:00<br>Duration: 00:00:30:00 |

FIG. 8

SIGNAL PROCESSING DEVICE

CROSS-REFERENCE TO RELATED APPLICATIONS

This application claims priority under 35 U.S.C. §119 to Japanese Patent Application No. 2012-048757 filed on Mar. 6, 2012 and Japanese Patent Application No. 2012-264525 filed on Dec. 3, 2012. The entire disclosures of Japanese Patent Application No. 2012-048757 and Japanese Patent Application No. 2012-264525 are hereby incorporated herein by reference.

BACKGROUND

1. Field of the Invention

The present invention relates to a signal processing device for solving a conflict state of editing.

2. Description of the Related Art

In recent years, devices have been popular that record a set of video data and/or a set of audio data in a file format into a randomly accessible recording medium (e.g., an optical disc, a semiconductor memory, etc.). For example, even in broadcasting stations and film-making companies, editing devices including such recording media have been used for executing video editing tasks and etc. To execute such video editing task, a material (e.g., a set of video data, a set of audio data, etc.) is recorded into a recording medium together with a set of metadata as a piece of additional information to such material. Thus, the set of metadata and a playlist are used for promoting efficiency in an editing task and etc. On the other hand, in such editing task, editing of a set of shot video data may be shared by a plurality of workers. For example, in applications requiring instantaneousness (e.g., video distribution, news distribution and etc. using networks), an editing task is required to be shared by a plurality of workers while being required to be executed without errors in a short period of time.

A technology of creating a playlist based on a signal selected by a switcher has been disclosed as a method of efficiently executing the aforementioned editing task. For example, Japan Laid-open Patent Application Publication No. JP-A-2004-274627 discloses a technology that a playlist is created based on a user's switch operation and is referred as an aid in executing an editing task.

However, the aforementioned conventional configuration has a drawback that, when an editing task is executed while being shared by a plurality of workers, it is difficult to modify conflicts among editing results (inconsistency in editing results attributed to differences in editing operations by the workers).

In view of the above drawback, a signal processing device of the present invention is enabled to compare a plurality of editing results created by a plurality of workers for the same object and select an appropriate editing result from the plurality of editing results. Convenience of users can be thereby enhanced in executing an editing task.

SUMMARY

A signal processing device of the present invention includes an operating unit, an editing database, a conflict detection unit and a conflict display unit. The operating unit is configured to output a plurality of pieces of editing result information as edited results of a set of signal data and a single or plurality of editing IDs for identifying the plurality of pieces of editing result information in association with each other. The editing database is configured to hold the plurality of pieces of editing result information and the single or plurality of editing IDs in association with each other. The conflict detection unit is configured to detect a difference between or differences among the plurality of pieces of editing result information associated with the same identical editing ID as a single or plurality of conflict states based on the plurality of pieces of editing result information and the single or plurality of editing IDs to be obtained from the editing database. The conflict display unit is configured to display the single or plurality of conflict states detected by the conflict detection unit.

ADVANTAGEOUS EFFECTS OF INVENTION

According to the signal processing device of the present invention, it is possible to compare a plurality of editing results created by a plurality of workers for the same object and select an appropriate editing result from the plural editing results. Convenience of users can be thereby enhanced in executing an editing task.

BRIEF DESCRIPTION OF THE DRAWINGS

Referring now to the attached drawings which form a part of this original disclosure:

FIG. 3 is a diagram showing a first playlist example in the exemplary embodiment1;

FIG. 4 is a diagram showing a second playlist example in the exemplary embodiment 1;

FIG. 6 is a diagram schematically showing a part of comparative objects in a conflict detection processing in the signal processing device 1;

FIG. 8 is a diagram showing a screen example to be displayed after a conflict is resolved in the signal processing device 1.

DETAILED DESCRIPTION

Exemplary embodiments will be hereinafter explained with reference to the attached drawings. It will be apparent to those skilled in the art from this disclosure that the following descriptions of the embodiments are provided for illustration only and not for the purpose of limiting the invention as defined by the appended claims and their equivalents.

(Exemplary Embodiment 1)

(1. Configuration of Signal Processing Device)

Figure 1:
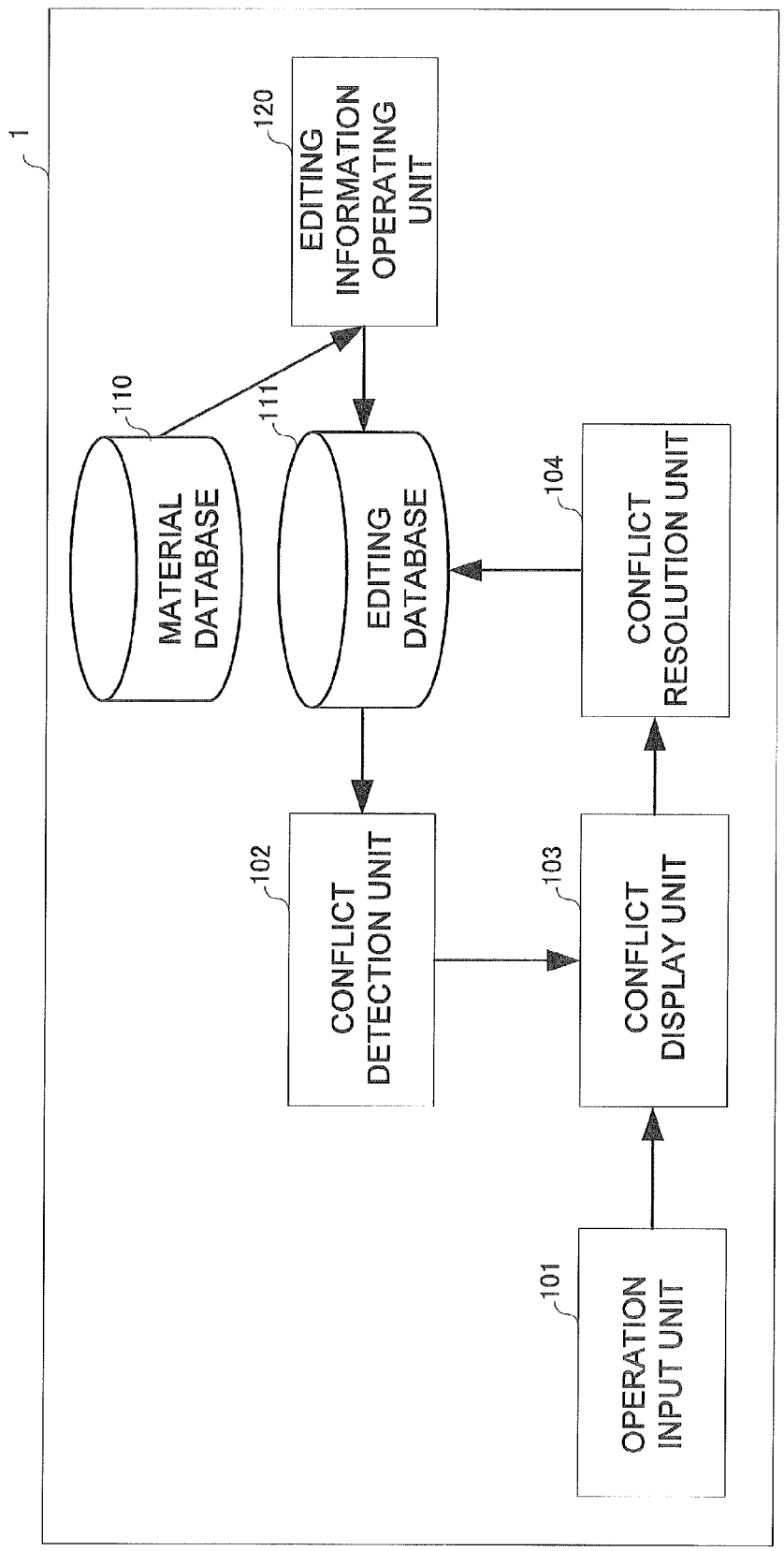
FIG. 1 is a block diagram showing a configuration of a signal processing device in an exemplary embodiment 1.

FIG. 1 is a block diagram showing a configuration of a signal processing device according to an exemplary embodiment 1. As shown in FIG. 1, a signal processing device 1 includes an operation input unit 101, a conflict detection unit 102, a conflict display unit 103, a conflict resolution unit 104, a material database 110, an editing database 111 and an editing information operating unit 120. For example, the signal processing device 1 is used as a device for executing real-time distribution of a concert event or the like and for editing a recorded material after the distribution. Edited video signals and etc. are herein assumed to be redistributed to general audience and be recorded in and sold as a package media. However, in real-time distribution and an editing task, chances are that an inappropriate video signal is distributed against user's wants due to various reasons (e.g., a user's erroneous operation, an accident, insufficient check, etc.). To prevent the chances, the present invention provides means for allowing a plurality of workers to execute an editing task, then modifying an editing result (e.g., through the selection of an appropriate one from a plurality of editing results) and finally generating an appropriate editing result.

The editing information operating unit 120 is a block configured to arbitrarily execute editing (e.g., creation of a playlist) through sorting of materials, section definition and etc. in response to an input by a user and further register a piece of editing result information as a result of the editing. The editing information operating unit 120 is configured to obtain sets of material data from the material database 110 and execute a display and editing processing based on the sets of material data and an editing operation instruction to be inputted by a user. Further, the editing information operating unit 120 is configured to associate the piece of editing result information as a result of an editing processing with an editing ID and register and set the piece of editing result information to the editing database 111. The term "material" herein refers to, for instance, a group of a video signal and an audio signal. The term "material data" herein refers to a set of data held and recorded in the material database 110. Further, the term "editing ID" refers to an identifier used for managing a piece of editing result information and for indicating that editing objectives of a plurality of pieces of editing result information are the same. When having the same editing objective, a plurality of pieces of editing result information are assigned editing IDs with the same value.

The material database 110 is a database for managing materials. A material is recorded as a set of material data in the material database 110. A set of material data is recorded in association with an identifier for identifying the set of material data (hereinafter referred to as a material ID). Based on data obtaining requests to be supplied thereto from respective components and a material ID, the material database 110 is configured to provide a set of material data corresponding to the material ID to respective components (e.g., the editing information operating unit 120).

The editing database 111 is a database for managing a piece of editing result information as an editing result. A piece of editing result information is recorded in association with an editing ID. Further, based on data obtaining requests issued when respective components request a set of data and an editing ID, the editing database 111 is configured to provide all the pieces of editing result information corresponding to the editing ID to respective components (e.g., the conflict detection unit 102). The term "editing result information" herein refers to, for instance, a playlist and an editing list (EDit List: EDL). The exemplary embodiment 1 will be explained using an example that a piece of editing result information is a playlist. Description will be provided below for a specific example of a playlist and so forth in the exemplary embodiment 1.

Data to be recorded in the material database 110 and the editing database 111 may be of any form as long as a set of data can be easily obtained therefrom using a material ID or an editing ID as a key. A technology of recording a set of data in these databases is a technology widely used in general. Therefore, specific explanation thereof will not be hereinafter provided.

The conflict detection unit 102 is a block for detecting a conflict state between or conflict states among a plurality of pieces of editing result information. The conflict detection unit 102 is configured to detect a single or plurality of conflict states based on the plurality of pieces of editing result information and an editing ID. Firstly, the conflict detection unit 102 is configured to send a data obtaining request together with an editing ID to the editing database 111 and obtain a plurality of pieces of editing result information corresponding to the editing ID. Next, the conflict detection unit 102 is configured to detect a conflict among the plurality of pieces of editing result information and provide the conflict display unit 103 with the detection result (hereinafter referred to as conflict detection information) and the plurality of pieces of editing result information obtained from the editing database 111.

The term "conflicts" herein refers to differences among a plurality of pieces of editing result information. For example, conflicts correspond to differences among playlist elements corresponding to each other in a plurality of playlists (a plurality of pieces of editing result information). Differences among playlist elements include differences among reproduction start points, differences among duration lengths (durations), differences among clips as reproduction objects and etc. Further, differences among playlist elements also include a case that no corresponding playlist element exists among playlists. For example, the case that no corresponding playlist element exists among playlists includes a case that no common reproduction duration exists among playlists.

It should be noted that the term "clip" refers to a group of a material recorded in a sequence and a piece of management information for managing and reproducing the material. Further, the term "playlist element" refers to a single reproduction unit forming a part of a playlist. A playlist element is formed by a clip to be reproduced, a reproduction start point thereof and an duration length thereof (alternatively, a reproduction end point).

The operation input unit 101 is a block for inputting a user's operation regarding determination of conflict resolution. The operation input unit 101 is configured to provide the conflict display unit 103 with a piece of information regarding an operation inputted by a user. For example, the operation input unit 101 receives inputting of a piece of editing result information selected by a user as a final editing result and a piece of information such as a priority for automatically executing selection.

The conflict display unit 103 is configured to execute conflict display for presenting a single or plurality of conflict states to a user based on the piece of conflict detection information and the piece of editing result information provided thereto from the conflict detection unit 102. In the conflict display, the following are displayed: states of playlist elements in each playlist; comparative states among playlists and those among playlist elements; and pieces of information (e.g., character strings, marks, etc.) for allowing a user to recognize a single or plurality of conflict states. Further, the conflict display unit 103 is configured to generate a piece of conflict resolution information based on the conflict display and the piece of operation information provided thereto from the operation input unit 101. Further, the conflict display unit 103 is configured to provide the conflict resolution unit 104 with the piece of conflict resolution information.

The term "conflict resolution information" herein refers to information for resolving a conflict In the exemplary embodiment 1, the following will be explained as methods of generating a piece of conflict resolution information: a method of allowing a user to input a piece of conflict resolution information through the operating input unit 101 based on his/her own decision; and a method of causing the conflict display unit 103 to automatically generate a piece of conflict resolution information. Specific processing thereof will be described below.

The conflict resolution unit 104 is configured to generate anew or update (hereinafter referred to as regenerate) a piece of editing result information based on the piece of conflict resolution information supplied thereto from the conflict display unit 103. Regeneration of a piece of editing result information is herein configured to be executed based on pieces of conflict resolution information and editing result information corresponding to the editing ID in the editing database 111. It should be noted that the processing of the conflict detection unit 102 will be executed again after a piece of editing result information is regenerated, i.e., when a conflicts is resolved. When being configured to display a post-update conflict state, for instance, the conflict display unit 103 displays the regenerated piece of editing result information.

Specifically, such signal processing device 1 can be implemented by adding respective functions explained in the exemplary embodiment 1 to an audio/video editing device or a content managing device, which is widely used in general. For example, the processing thereof are implemented by a software program designed to run on a general-purpose computer and hardware such as an audio/video signal processing circuit, a microcomputer and a memory.

(2. Processing Flow)

A processing flow of the signal processing device 1 will be hereinafter explained. The processing of the signal processing device 1 is mainly formed by four processing steps. The processing in the four steps include: a playlist registration processing to be executed in a first processing step; a conflict detection processing to be executed in a second processing step; a conflict display processing to be executed in a third processing step; and a conflict resolution processing to be executed in a fourth step. Through the processing of the four steps, it is possible to detect a conflict state between or conflict states among a plurality of playlists edited for the same objective, and further, resolve the conflict state. As a result, it becomes possible to integrate intensions of a plurality of editors and obtain a single editing result, and further, execute modification of errors in an editing task and/or editing check by a plurality of workers.

Firstly, explanation will be hereinafter provided for the playlist registration processing to be executed in the first processing step. Each playlist is herein formed by, for instance, one or more playlist elements. Further, each playlist element is formed by the order thereof to be reproduced in another reproduction device, a clip as an object to be reproduced and a reproduction duration defined by a start time and an duration length. Playlists are configured to be reproduced in another reproduction device enabled to reproduce the playlists. The reproduction device is configured to reproduce the target clips of the respective playlist elements based on the order of the playlist elements described in the playlist for a specified reproduction duration (i.e., until the duration length is elapsed from the start time).

Now, two exemplary methods will be explained for the playlist registration processing in the exemplary embodiment 1. In a first playlist registration method, a playlist is created in a device different from the signal processing device 1 and is then inputted into the editing information operating unit 120. By contrast, in a second playlist registration method, a playlist is created in the editing information operating unit 120 of the signal processing device 1.

In the case of the first playlist registration method, for instance, the editing information operating unit 120 is configured to read out a playlist created in another device through a recording medium or a network transmission (not shown in the figures) and then register the read-out playlist to the editing database 111. By contrast, in the case of the second playlist registration method, the editing information operating unit 120 is configured to generate a playlist based on a user's input, and simultaneously, register the generated playlist to the editing database 111.

It should be noted that any playlist registration method may be used as long as the editing information operating unit 120 is configured to be able to register a playlist to the editing database 111.

Further, in registering a playlist, the editing information operating unit 120 is configured to associate the playlist with an editing ID and register the playlist to the editing database 111. This is executed for executing a processing of detecting a conflict state between or conflict states among a plurality of playlists based on the editing ID in the processing of subsequent steps. Specific explanation will be provided below for the playlist registration processing in the editing information operating unit 120.

Next, explanation will be provided for a processing of detecting a conflict state between or conflict states among playlists (hereinafter referred to as a conflict detection processing) that is executed in the second processing step. The conflict detection unit 102 is configured to execute the conflict detection processing based on pieces of information regarding a plurality of playlists associated with the same editing ID registered to the editing database 111.

For example, the conflict detection unit 102 is configured to start the conflict detection processing in response to: a conflict detection start instruction to be supplied thereto from the operation input unit 101 based on a user's input; or detection of change in a registration condition of a playlist registered to the editing database 111. When the conflict detection processing is started in response to a conflict detection start instruction based on a user's input, for instance, the conflict detection unit 102 is informed of the conflict detection start instruction through the operation input unit 101 in response to pressing of a button mounted on the operation input unit 101 for instructing start of conflict detection.

By contrast, when the conflict detection processing is started in response to change in a registration condition of a playlist, the conflict detection unit 102 detects registration or update of a playlist associated with an editing ID as a current object to the editing database 111. Then, the conflict detection start instruction is issued to the conflict detection unit 102 (i.e., the same processing as that executed in issuing a conflict detection start instruction may be herein configured to be executed). Detection of change in a playlist registration condition may be executed with a method of checking the editing database 111 on a regular basis or a method of informing the conflict detection unit 102 of registration or update of a playlist. In the exemplary embodiment 1, to easily separate the playlist registration processing and the conflict detection processing, explanation will be provided for the exemplary method of checking the editing database on a regular basis.

Next, the conflict detection unit 102 starts executing the conflict detection processing in response to the aforementioned conflict detection start instruction. Firstly, in the conflict detection processing, all the playlists associated with the same editing ID are obtained from the editing database 111. Here, a user may preliminarily select one from all the editing IDs registered to the editing database 111. Alternatively, an editing ID may be selected that is set as a current editing object in the conflict detection unit 102. Next, differences are detected among the plural playlists herein obtained. Specific explanation will be provided below for the conflict detection processing in the conflict detection unit 102.

Next, explanation will be provided for a conflict display processing to be executed in the third processing step. Conflict display is executed for presenting conflicts (differences) among a plurality of playlists to a user. For example, a plurality of playlists and a conflict state between or conflict states among them are displayed on a screen. Firstly, after the conflict detection processing is finished, the conflict detection unit 102 is configured to provide the conflict display unit 103 with a display update instruction, a piece of conflict detection information and all or part of playlists associated with the same editing ID. The playlists to be provided to the conflict display unit 103 are determined depending on what kind of display should be presented to a user on the conflict display unit 103. When a user can identify conflicts among the playlists through the partial information display, the conflict display unit 103 is provided with pieces of information regarding playlists required for display or only required pieces of information in each playlist. In the exemplary embodiment 1, explanation will be provided for the example of providing all the pieces of information. Next, the conflict display unit 103 is configured to execute the conflict display processing based on the piece of conflict detection information provided thereto from the conflict detection unit 102 and the plural playlists associated with the same editing ID. Explanation will be provided below for the specific processing of conflict display by the conflict display unit 103.

Next, explanation will be provided for a conflict resolution processing to be executed in the fourth processing step. Firstly, in the processing of resolving a conflict state, the following processing will be executed: a conflict resolution method is inputted; a playlist is then regenerated; and the playlist in the editing database 111 is updated as the regenerated playlist. For example, the regenerated playlist is set as a final editing result or a post-check editing result. Firstly, a user inputs a method of resolving conflicts through the operation input unit 101 based on the conflict display in the processing of the third processing step. For example, a user inputs a method of resolving a conflict state through the operation input unit 101 with reference to the screen displayed on the conflict display unit 103. The operation input unit 101 is configured to provide the conflict resolution unit 104 with the inputted piece of information through the conflict display unit 103. The conflict resolution unit 104 is configured to execute a playlist regeneration processing based on the inputted piece of information supplied thereto. The term "playlist regeneration processing" herein refers to a processing of changing a playlist based on a conflict resolution method. After the playlist generation processing is completed, the conflict resolution unit 104 is configured to update a playlist from a pre-playlist regeneration processing state to a post-playlist regeneration processing state in the editing database 111. For example, the update is implemented by overwriting of a corresponding playlist in or initial registration of a new playlist to the editing database 111. Specific explanation will be provided below for the processing in the conflict resolution method including the input processing, the playlist regeneration processing and the playlist update processing.

(3. Registration of Playlist)
(3-1. Recording Format of Playlist)

Figure 2:
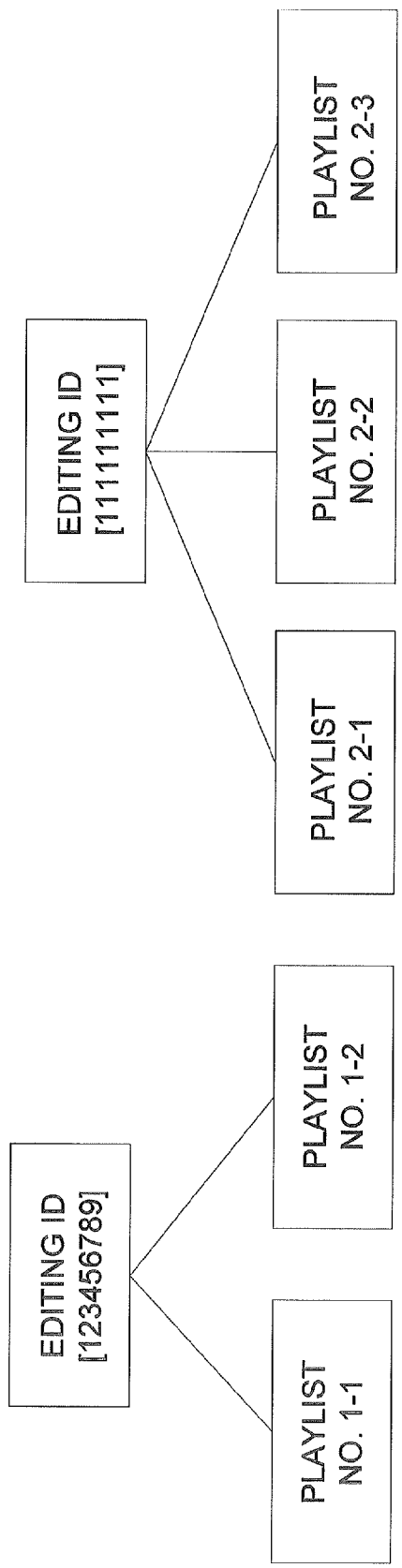
FIG. 2 is a schematic diagram showing a relation between editing IDs and playlists in the exemplary embodiment 1.

Specific explanation will be provided for a recording format of a playlist in the editing database 111. FIG. 2 is a schematic diagram showing a relation between editing IDs and playlists. For example, FIG. 2 shows a state that playlists Nos. 1-1 and 1-2 are associated with an editing ID [1234456789] and a state that playlists Nos. 2-1, 2-2 and 2-3 are associated with an editing ID [111111111]. The editing ID is herein set as a unique identifier within the editing database 111. For example, in the exemplary embodiment 1, an editing ID is a nine digit number. In FIG. 2, the editing ID [123456789] represents that a value of the editing ID is "123456789". Thus, with the configuration that a value of an editing ID and a playlist are recorded in association with each other, respective components of the signal processing device 1 can obtain all the relevant playlists from the editing database 111 based on an editing ID. For example, playlists of playlists Nos. 1-1 and 1-2 can be obtained based on the editing ID [123456789]. Further, the editing database 111 is configured to provide pieces of information regarding all the playlists associated with the same editing ID value based on a request from another block. The method of association, the method of obtaining a set of data from a database and etc. are technologies widely used in general for databases and etc. Therefore, detailed explanation thereof will not be hereinafter provided.

(3-2. Specific Example of Playlist)

A specific example of a playlist as a processing object will be hereinafter explained for specifically explaining respective processing in the exemplary embodiment 1. FIGS. 3 and 4 show two specific playlist examples. For example, the playlist example in FIG. 3 corresponds to the playlist No. 1-1 in FIG. 2, whereas the playlist example in FIG. 4 corresponds to the playlist No. 1-2 in FIG. 2. Further, FIGS. 3 and 4 show that each playlist example is formed by four playlist elements with "No." valued as 1 to 4. It should be noted that the playlist example in FIG. 3 will be hereinafter referred to as a first playlist example, whereas the playlist example in FIG. 4 will be hereinafter referred to as a second playlist example.

As shown in FIGS. 3 and 4, each playlist element of a playlist in the exemplary embodiment 1 is formed by items "Clip ID", "Start Time" and "Duration". The item "Clip ID" corresponds to an identifier (material ID) for identifying a clip (material data) and is set as a name or a number uniquely allocated to each clip. The example of FIG. 3 shows that two clips with "Clip ID" of "C1" and "C2" are referred in the playlist. The item "Start Time" corresponds to a reproduction start point in a reproduction duration of a referred clip in a playlist element. The example of FIG. 3 shows that in the playlist element with "No." valued as 1, clock time 00: 00:10: 00 is set as the reproduction start point of the clip "C1". As represented by 00:00:10:00, clock time is herein configured to be expressed in the order of hour, minute, second and frame. This is a format generally used as a time code in general, for instance, in the field of film making for professional applications or broadcasting applications. The item "Duration" corresponds to a duration length (period) in a reproduction duration of a playlist element. For example, the example of FIG. 3 shows that in the playlist element with "No." valued as 1, "Duration" is 20 seconds.

It should be noted that "No." in FIGS. 3 and 4 represents the number of a playlist element and playlist elements are configured to be sequentially reproduced in an ascending order of a value of the number for a specified reproduction duration. Even when "No." does not exist as an item of a playlist, the reproduction order of playlist elements can be defined by, for instance, the order of playlist elements listed in a playlist. For easy explanation, "No." is shown in FIGS. 3 and 4.

(3-3. Registration Processing of Playlist)

Specific explanation will be provided for the playlist registration processing in the editing information operating unit 120. In the exemplary embodiment 1, two playlist registration methods will be explained. One of the methods is a first playlist registration method that arbitrary playlists have been preliminarily created in a device different from the signal processing device 1 as the playlist registration processing and the playlists are inputted into the editing information operating unit 120. The other of the methods is a second playlist registration method that playlists are created in the editing information operating unit 120 of the signal processing device 1.

In the first playlist registration method, the editing information operating unit 120 is configured to register the playlists preliminarily created in another device to the editing database 111. For example, when the playlists shown in FIGS. 3 and 4 have been preliminarily created in another device, the editing information operating unit 120 registers the two playlists to the editing database 111. The editing IDs of the two playlists are herein registered to the editing database 111, while being associated with the same value. For example, the editing information operating unit 120 may be configured to automatically generate editing IDs in response to a user's operation, select the automatically generated editing IDs having the same value in registering the two playlists in FIG. 3 (the playlist No. 1-1) and FIG. 4 (the playlist No. 1-2), and associate the editing IDs with the two playlists to be registered. Through the user's operation and the playlist registration processing, the two playlists in FIG. 3 (the playlist No. 1-1) and FIG. 4 (the playlist No. 1-2) are configured to be registered to the editing database 111 while being associated with the same editing ID. It should be noted that a nine digit number (e.g., the editing ID [123456789] as shown in the example of FIG. 2), for instance, is generated in the automatic generation of an editing ID.

In the second playlist registration method, a plurality of playlists generated by the editing information operating unit 120 are registered to the editing database 111. Firstly, the editing information operating unit 120 is configured to refer to clips (material data) registered to the material database 110, present the clips to a user, and generate a playlist based on a user's editing operation. In general, such technology of generating a playlist has been widely used in video editing devices, video editing software programs and etc. Therefore, detailed explanation thereof will not be hereinafter provided. Next, the editing information operating unit 120 is configured to register the playlist created by the playlist generation processing to the editing database 111. It should be noted that a plurality of users are preferably allowed to operate the playlist generating processing in the editing information operating unit 120. The configuration can be implemented by providing a plurality of processing channels for generating a playlist and a plurality of input channels of an editing operation for the generated playlist. In this case, the plural playlists herein created are registered to the editing database 111 while being associated with the same editing ID value. For example, the editing ID is set by associating the same value with playlists generated in the same term or period. This is due to the assumption in the exemplary embodiment 1 that an editing task is simultaneously executed by a plurality of users. Further, in the second playlist registration method, conflict detection can be executed on an as-needed basis while an editing task is executed. Specifically, the aforementioned processing of playlist registration and after-mentioned processing of conflict detection, conflict display and conflict resolution are configured to be executed for each user's editing operational input. The configuration is advantageous in that a plurality of workers can instantly determine conflict while simultaneously executing an editing task. Therefore, the configuration is quite effective when an editing task is required to be completed in a short period of time.

(4. Conflict Detection and Conflict Display)

Specific explanation will be provided for the conflict detection processing in the conflict detection unit 102. The conflict detection unit 102 is configured to compare corresponding playlist elements among a plurality of playlists and detect differences among them. Specifically, a playlist (comparative source playlist) is focused, and respective items of the respective playlist elements contained in the playlist are compared to corresponding items of the respective playlist elements contained in another playlist (comparative object playlist). Differences are detected among a plurality of playlists by executing the processing with respect to all the combinations of playlists and playlist elements.

The conflict detection processing and the conflict display processing will be hereinafter explained, for instance, with a specific example where the two playlist examples in FIGS. 3 and 4 are associated with the same editing ID value. It should be noted that, for easy explanation, the conflict detection processing and the conflict display processing will be hereinafter explained interchangeably. However, the conflict detection processing and the conflict display processing may be sequentially executed on a processing-by-processing basis, or alternatively, a detection result may be displayed while the conflict detection processing is sequentially executed as described above.

Figure 5:
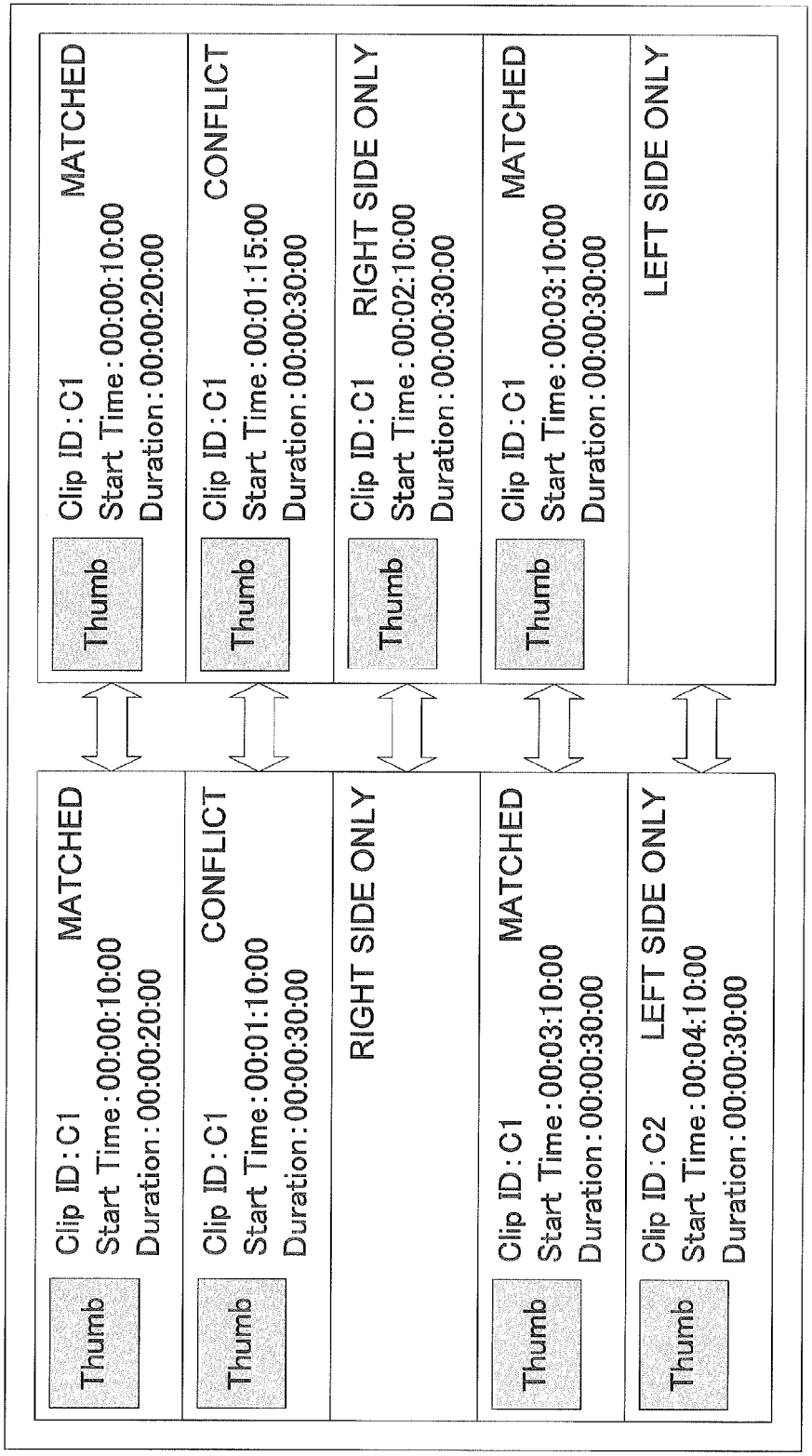
FIG. 5 is a diagram showing a specific example of conflict display in a signal processing device 1.

Firstly, explanation will be provided for a screen example of conflict display to be used for explaining the present exemplary modification. FIG. 5 shows a specific display example of conflict between the two playlist examples in FIGS. 3 and 4. In FIG. 5, the left-side list corresponds to the playlist example in FIG. 3, whereas the right-side list corresponds to the playlist example in FIG. 4. In FIG. 5, conflict states of the respective playlist elements are expressed with display of character strings "MATCHED", "CONFLICT", "RIGHT SIDE ONLY" and "LEFT SIDE ONLY". The character string "MATCHED" represents that completely corresponding playlist elements exist among a plurality of playlists. The expression "completely corresponding" herein means that all the items are completely matched between playlist elements.

For example, FIG. 5 shows that two playlist elements displayed with the character string "MATCHED" (listed on the top of the two playlists) are completely matched because values of all the items contained therein are matched. The character string "CONFLICT" represents a condition that reproduction durations of two playlist elements are overlapped but are not completely matched. In FIG. 5, for instance, a left-side playlist element displayed with the character string "CONFLICT" (listed on the second top) has the item "Start Time" of "00:01:10:00", whereas a right-side playlist element displayed with the character string "CONFLICT" (listed on the second top) has the item "Start Time" of "00:01:15:00". A five-second difference exists between the items "Start Time" of the two playlist elements. However, the items "Duration" in two playlist elements are both 30 seconds. Accordingly, two durations are overlapped when the playlist elements are reproduced based on the playlists.

The character string "RIGHT SIDE ONLY" represents that a playlist element does not exist in the left-side playlist. In other words, the character string represents that the playlist element exists only in the playlist displayed on the right side (e.g., the playlist example in FIG. 4). In FIG. 5, for instance, regarding playlist elements displayed with the character string "RIGHT SIDE ONLY" (listed on the third top), only the playlist displayed on the right side (the playlist example in FIG. 4) has a playlist element that a clip "C1" is reproduced for 30 seconds from "Start Time" of 00:02:10:00.

The character string "LEFT SIDE ONLY" represents a condition contrary to that of the character string "RIGHT SIDE ONLY". The character string "LEFT SIDE ONLY" represents that a playlist element does not exist in the right-side playlist. In other words, the character string represents that the playlist element exists only in the playlist displayed on the left side (e.g., the playlist example in FIG. 3).

It should be noted that a display example of conflict between two playlist is explained in the exemplary embodiment 1. However, the configuration can be similarly applied to display of conflict among three or more playlists. For example, the number of columns is arbitrarily changed based on the number of playlists in order to execute display of conflict among three or more playlists. In this case, when a playlist element exists only in one of the playlists (columns), the playlist element is expressed with another character string (e.g., "EXIST ONLY IN THIS PLAYLIST") instead of display of the character strings "RIGHT SIDE ONLY" and "LEFT SIDE ONLY".

Next, with reference to the playlist examples in FIGS. 3 and 4, the conflict detection processing and the conflict display processing will be specifically explained using FIGS. 5 and 6. FIG. 6 corresponds to a result of the conflict detection processing in the display example of FIG. 5.

Regarding the playlist examples in FIGS. 3 and 4, FIG. 6 schematically shows a part of comparative objects in comparison to be executed in the conflict detection processing. Further in FIG. 6, a first playlist example corresponds to the playlist example in FIG. 3, whereas a second playlist example corresponds to the playlist example in FIG. 4. Yet further in FIG. 6, a playlist element with "No." valued as 1, contained in the first playlist example, is set as a comparative source playlist element, whereas all the playlist elements contained in the second playlist example are set as comparative object playlist elements. FIG. 6 schematically shows a situation that comparison is executed using the comparative source playlist element and the comparative object playlist elements. When the comparison in FIG. 6 is finished, a playlist element with "No." valued as 2, contained in the first playlist example, is then set to be the comparative source playlist element, for instance, and comparison is repeated similarly to the above.

Thus, the conflict detection processing is implemented, for instance, by comparing playlist elements between the first playlist example and the second playlist example on a round-robin manner.

Figure 7:
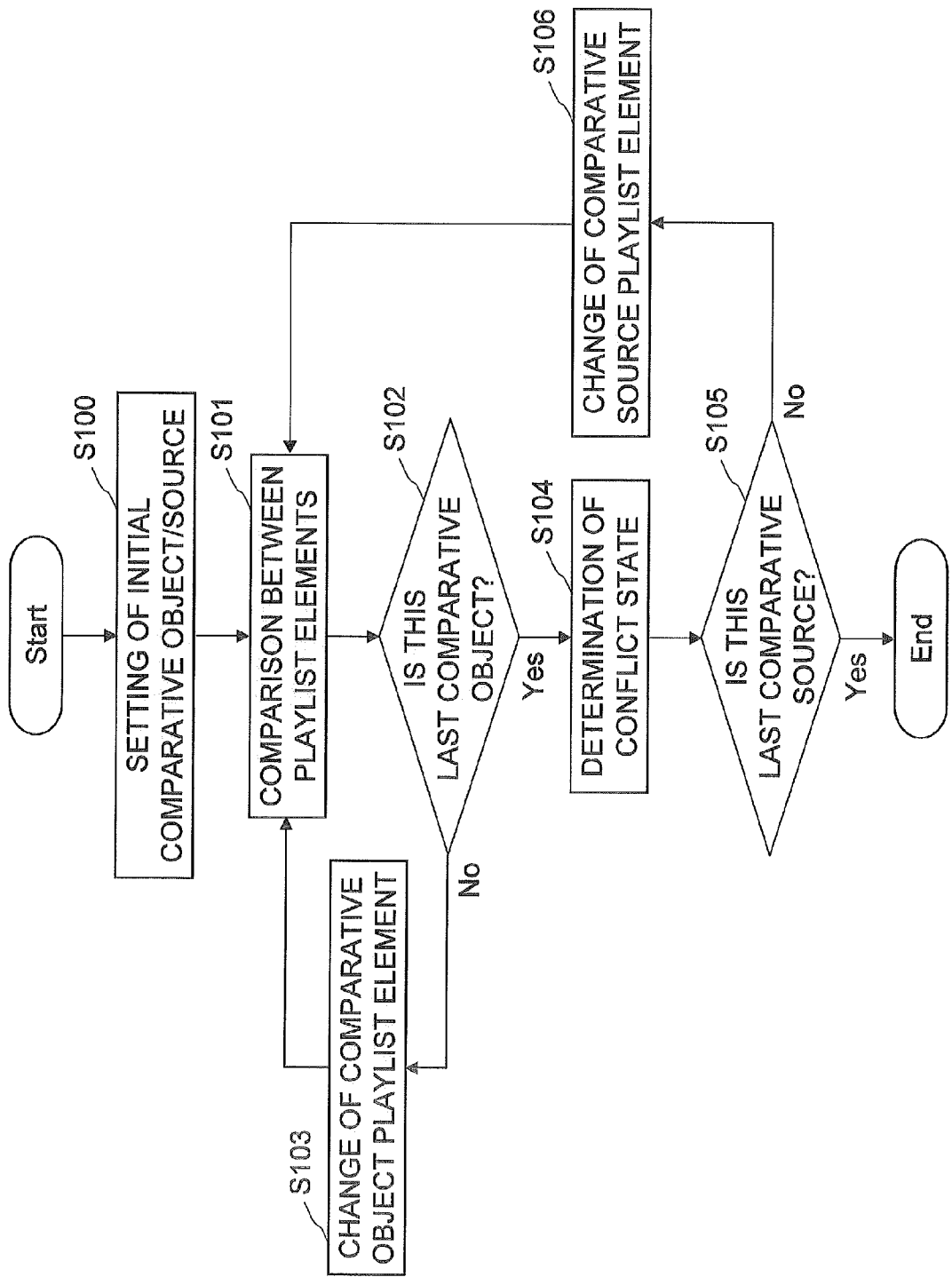
FIG. 7 is a diagram showing a processing flow of conflict detection in the signal processing device 1.

FIG. 7 shows a specific processing flow in the conflict detection processing. Firstly in Step S100, a comparative object playlist and initial values of playlist elements contained in the comparative object playlist are set, while a comparative source playlist and initial values of playlist elements contained in the comparative source playlist are set. For example, when the playlists and the playlist elements are sequentially compared, the initial value of "No." in the first playlist example as a comparative source is set to be 1. On the other hand, the initial value of "No." in the second playlist example as a comparative object is also set to be 1.

Next in Step S101, a conflict state is determined by comparing values of respective items of playlist elements in the comparative source and those in the comparative object. For example, when comparison is executed between a playlist element with "No." valued as 1 in the first playlist example and that in the second playlist example, values of all the items are matched (i.e., completely corresponded) between the playlist elements.

On the other hand, when comparison is executed between the playlist element with "No." valued as 1 in the first playlist example and a playlist element with "No." valued as 2 in the second playlist example, a difference exists between values of the items "Start Time". When such difference exists, it is further determined whether or not the playlist elements are overlapped.

For example, overlapping is herein determined based on whether or not a value of "Start Time" (clock time) of the playlist element with "No." valued as 2 in the second playlist example is included in a value range regarding the playlist element with "No." valued as 1 in the first playlist example, i.e., a value range from a value of "Start Time" (clock time) to a value (clock time) obtained by adding a value of "Duration" to the value of "Start Time".

Through the processing, playlist elements as comparative objects can be categorized into "NO DIFFERENCE", "DIFFERENCE WITH OVERLAPPED DURATION" and "DIFFERENCE WITHOUT OVERLAPPED DURATION". It should be noted that "conflict state information" will be used as a generic term of the aforementioned pieces of information. The pieces of conflict state information are configured to be held as a group for each comparative source playlist element and be used in the processing of Step S104.

Next in Step S102, it is determined whether or not the current comparative object playlist element is the final one in the playlist. The processing herein returns to Step S103 when the current comparative object playlist element is not the final one. By contrast, the processing proceeds to Step S104 when the current comparative object playlist element is the final one. In Step S103, the comparative object playlist element is changed. For example, the next playlist element is set by incrementing the value of "No." in the second playlist example. For example, as shown in FIG. 6, through the repetition of comparison in Step S101 as described above, comparison is completed for respective items between the playlist element with "No." valued as 1 in the first playlist example and all the playlist elements in the second playlist example. The processing in Step S104 is subsequently executed.

Next in Step S104, a conflict state regarding a comparative source playlist element is determined based on the grouped pieces of conflict state information held in Step S101. Firstly, in the processing of determining a conflict state, the grouped pieces of conflict state information are categorized into a case that "NO DIFFERENCE" exists (Category 1), a case that "DIFFERENCE WITH OVERLAPPED DURATION" exists (Category 2), and the remaining cases (Category 3).

In the case of Category 1, playlist elements are completed matched. Therefore, in the display example of FIG. 5, the character string "MATCHED" is displayed on the screen areas of relevant playlist elements. In the case of Category 2, playlist elements are in a conflict state. Therefore, in the display example of FIG. 5, the character string "CONFLICT" is displayed on the screen areas of relevant playlist elements. In the case of Category 3, display content is determined based on a playlist that contains a relevant playlist element. For example, in the display example of FIG. 5, either the character string "LEFT SIDE ONLY" or "RIGHT SIDE ONLY" is displayed on the screen areas of relevant playlist elements.

Firstly, explanation will be herein provided for determination of a conflict state where the comparative source is the playlist element with "No." valued as 1 in the first playlist example. The grouped pieces of conflict state information are herein determined for a playlist element as a comparative source based on the comparative source playlist element and all the playlist elements as comparative objects in the second playlist example. Therefore, as being determinable from FIG. 6, the grouped pieces of conflict state information regarding the comparative source playlist element herein include pieces of information categorized as "NO DIFFERENCE", "DIFFERENCE WITHOUT OVERLAPPED DURATION", "DIFFERENCE WITHOUT OVERLAPPED DURATION" and "DIFFERENCE WITHOUT OVERLAPPED DURATION".

The grouped pieces of conflict state information regarding the comparative source playlist element contains a piece of information categorized as "NO DIFFERENCE". It is herein determined that the playlist element with "No." valued as 1 in the first playlist example and that in the second playlist example are matched (i.e., completely corresponded). The character string "MATCHED" in the display example of FIG. 5 is displayed based on the conflict state determination.

Further, explanation will be provided for determination of a conflict state, for instance, where a comparative source is the playlist element with "No." valued as 2 in the first playlist example. In this case, the grouped pieces of conflict state information regarding the comparative source playlist element include pieces of information categorized as "DIFFERENCE WITHOUT OVERLAPPED DURATION", "DIFFERENCE WITH OVERLAPPED DURATION", "DIFFERENCE WITHOUT OVERLAPPED DURATION" and "DIFFERENCE WITHOUT OVERLAPPED DURATION".

In this case, a piece of information categorized as "DIFFERENCE WITH OVERLAPPED DURATION" is included. Therefore, it is determined that the playlist element with "No." valued as 2 in the first playlist example conflicts with the playlist element with "No." valued as 2 in the second playlist example. In other words, it is determined that these two playlist elements are corresponded to each other but are partially different from each other. The character string "CONFLICT" in the display example of FIG. 5 is displayed based on the conflict state determination.

Yet further, explanation will be provided for determination of a conflict state, for instance, where the comparative source is a playlist element with "No." valued as 4 in the first playlist example. The grouped pieces of conflict state information regarding the comparative source playlist element include pieces of information categorized as "DIFFERENCE WITHOUT OVERLAPPED DURATION", "DIFFERENCE WITHOUT OVERLAPPED DURATION", "DIFFERENCE WITHOUT OVERLAPPED DURATION" and "DIFFERENCE WITHOUT OVERLAPPED DURATION". Based on the grouped pieces of conflict state information regarding the comparative source playlist element, it is determined that a playlist element exists only in the first playlist example as the current comparative source (i.e., the playlist displayed on the left side in the example of FIG. 5). The character string "LEFT SIDE ONLY" in the display example of FIG. 5 is displayed based on the conflict state determination.

Processing in Step S105 will be executed after the aforementioned processing in Step S104 is completed. It should be noted that, when the processing in Step S104 is completed, it is possible to discard the grouped pieces of conflict state information regarding the comparative source playlist element for which the processing is competed.

In Step S105, it is determined whether or not the current comparative source playlist element is the final playlist element in the comparative source playlist. The conflict detection processing is herein finished when the current comparative source playlist element is the final playlist element. By contrast, the processing returns to Step S101 via Step S106 when the current comparative source playlist is not the final playlist element. In Step S106, the comparative source playlist element as a processing object will be changed.

Through the repeated execution of the processing, the playlist elements in the comparative source playlist and those in the comparative object playlist are processed in all combinations. In other words, conflict detection is executed for two playlists. It should be noted that the aforementioned processing is not limited to the form explained in the exemplary embodiment 1. Any other forms may be applied to the processing as long as a conflict state can be thereby distinguished.

Further in the exemplary embodiment 1, the playlist conflict detection processing for two playlists has been explained. However, two or more playlists can be processed as follows. For example, the conflict detection processing is executed for all the playlists by arbitrarily setting a comparative source playlist and a comparative object playlist and by repeatedly executing entirety of the aforementioned processing at a plurality of times. For example, when the processing is completed for all the playlist elements in a playlist set as a current processing object in Step S106, a playlist element listed on the top of an unprocessed playlist is set as a comparative source playlist element. On the other hand, when the processing is completed for all the playlist elements in a playlist set as a current processing object in Step S103, a playlist element listed on the top of an unprocessed playlist is set as a comparative object playlist element. Through the processing as described above, even two or more playlists can be processed.

(5. Resolution of Conflict)

(5-1. Input of Resolution Method)

Specific explanation will be provided for a method of inputting pieces of conflict resolution information to resolve a conflict. In the exemplary embodiment 1, examples of first and second resolution methods will be explained. In the first resolution method, all the pieces of conflict resolution information are determined by user's inputs. In the second resolution method, pieces of conflict resolution information are semi-automatically determined based on a predetermined rule.

The first resolution method is a method that all the pieces of conflict resolution information are inputted by a user. For example, in the display example of FIG. 5, a piece of conflict resolution information is inputted for each playlist element based on a user's judgment. Inputting a piece of conflict resolution information, for instance, user's selection of a predetermined playlist element is implemented by the conflict resolution unit 104. The conflict resolution unit 104 is configured to select any of the playlist elements in a conflict state based on an input provided thereto through the operation input unit 101 and the conflict display unit 103. For example, the operation input unit 101 and the conflict display unit 103 are formed by buttons, a screen display menu and etc. Through the selection, resolution of a conflict state, i.e., change of a playlist element is executed.

FIG. 8 shows a screen example to be displayed after conflict resolution (after regeneration of a playlist). FIG. 8 shows a result obtained when the left-side playlist (the first playlist example) is selected regarding the second top playlist elements in the display example of FIG. 5; the right-side playlist (the second playlist example) is selected regarding the third top playlist elements in the display example of FIG. 5; and the left-side playlist (the first playlist example) is selected regarding the fifth top playlist elements in the display example of FIG. 5.

As described below, a user can easily resolve a conflict state by selecting either of the playlist elements in a conflict state. For example, a playlist element in a conflict state, contained in a playlist source (e.g., the left-side playlist in FIG. 5), is changed with reference to a playlist element contained in a playlist object (e.g., a playlist element in the right-side playlist of FIG. 5).

The second resolution method is a method of automatically generating pieces of conflict resolution information. In the exemplary embodiment 1, two examples will be explained as the conflict resolution information generating method. A first conflict resolution information generating method is a method of generating pieces of conflict resolution information based on a priority definition. A second conflict resolution information generating method is a method of generating pieces of conflict resolution information based on majority vote.

Firstly, in the first conflict resolution information generating method, priority is preliminarily set for respective playlists. Then, pieces of conflict resolution information are generated based on the priority. More specifically, values of priority (e.g., numeric values) are recorded while being associated with a comparative source playlist and a comparative object playlist. Then, based on the magnitude of priority values, pieces of conflict resolution information are generated as follows.

For example, the first conflict resolution information generating method exerts an effect in conflict resolution for a case that an expert editor generates a playlist while a novice editor generates another playlist. In such case, a higher priority is set for the playlist created by the expert editor. For example, when a playlist element exists only in the playlist created by the expert editor, the conflict resolution unit 104 is configured to automatically select a playlist element with a higher priority, i.e., the playlist element in the playlist created by the expert editor without intervention of a user's conflict resolution information input and set the selected playlist element as a piece of conflict resolution information. Accordingly, frequency of user's inputs (operations) can be remarkably reduced in generating pieces of conflict resolution information.

Next, in the second conflict resolution information generating method, pieces of conflict resolution information are generated based on majority vote. For example, where a plurality of playlists exist, the conflict resolution unit 104 is configured to generate a piece of conflict resolution information by preferentially selecting a playlist element when the number of playlist elements in the same state (either a conflict state or a matched state) as the playlist element is the greatest. Accordingly, a piece of conflict resolution information can be generated without intervention of a user's conflict resolution information input.

For example, it is determined whether or not a target playlist element is selected based on a threshold or etc. (including percentage) set for playlists. For example, where a threshold has been preliminarily set to be 80%, a target playlist element is automatically selected and a piece of conflict resolution information is generated when the percentage of playlist elements in the same state as the target playlist element exceeds 80%.

To implement the second conflict resolution information generating method, the number of playlist elements completely corresponding to a comparative source playlist element is held while being contained in the grouped pieces of conflict state information held in Step S101. Then, when the number is greater than or equal to a preliminarily set threshold, the comparative source playlist element is automatically selected.

It should be noted that the conflict resolution information generating methods (the second resolution method) may be configured to be processed in combination with the aforementioned conflict resolution information input method (the first resolution method). In this case, a user is allowed to select which one should be employed from the first and second resolution methods or which one should be employed from the conflict resolution generating methods. Further, those pieces of conflict resolution information (which playlist contains a selected playlist element, etc.) are configured to be provided to the conflict resolution unit 104 through the operation input unit 101 and the conflict display unit 103.

(5-2. Regeneration and Update of Playlist)

Specific explanation will be provided for the playlist regeneration processing in the conflict resolution unit 104. The conflict resolution unit 104 is configured to execute the playlist regeneration processing based on the piece of conflict resolution information provided thereto from the conflict display unit 103. For example, change of a playlist element is executed with respect to a source playlist (e.g., the left-side playlist in FIG. 5) based on the piece of conflict resolution information. When a playlist element, selected either automatically or manually by a user, is contained in the source playlist, the playlist element is not required to be changed (i.e., the playlist element is maintained).

On the other hand, when a playlist element, selected either automatically or manually by a user, is contained in another playlist, and further, when the selected playlist element corresponds to "CONFLICT", respective items of a corresponding playlist element of the source playlist are overwritten by the corresponding items of the playlist element of another playlist. Further, when the selected playlist element corresponds to "RIGHT SIDE ONLY", the selected playlist element is added to the source playlist. In this case, the selected playlist element is added to a position of the order displayed on the conflict display unit 103. Yet further, when the right-side playlist is selected regarding a playlist element corresponding to "LEFT SIDE ONLY" (i.e., the right-side playlist does not contain the corresponding playlist element), for instance, the playlist element corresponding to "LEFT SIDE ONLY" is deleted from the source playlist. For example, when a playlist, regenerated based on the source playlist, is redisplayed after the aforementioned processing is executed, the redisplayed screen is as shown in FIG. 8.

Next, the conflict resolution unit 104 is configured to execute a playlist update processing for the editing database 111 after the playlist is regenerated. For example, the source playlist registered to the editing database 111 is overwritten and registered by the regenerated playlist. Alternatively, the regenerated playlist is registered as a new playlist to the editing database 111, while the name and the editing ID thereof are changed.

INDUSTRIAL APPLICABILITY

The signal processing device according to the present exemplary embodiment serves to enhance convenience of a user in executing an editing task or a checking task by a plurality of workers. The present signal processing device is widely applicable to a variety of devices such as a device for processing audio and video signals to which a semiconductor memory, an optical disc and etc. are applied.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the signal processing device. Accordingly, these terms, as utilized to describe the technology disclosed herein should be interpreted relative to the signal processing device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A signal processing device, comprising:
   an operating unit configured to output a plurality of pieces of editing result information and at least one editing ID, the pieces of editing result information being edited results of a set of signal data, each piece of editing result information including a playlist,
   each playlist including a reproduction duration,
   the at least one editing ID indicating the pieces of editing result information are a result of an edit to the set of signal data, and identifying associations between the pieces of editing result information;
   an editing database configured to store the pieces of editing result information and the at least one editing ID, and associate corresponding editing result information with the at least one editing ID;
   a conflict detection unit configured to:
      detect one or more differences between the pieces of editing result information associated with a single editing ID based on the pieces of editing result information and the one or more editing IDs obtained from the editing database,
      detect the one or more differences if no common reproduction duration exists between playlists, and
      identify each of the one or more differences as one or more conflict states; and
   a conflict display unit configured to display the one or more conflict states detected by the conflict detection unit.

2. The signal processing device according to claim 1, further comprising:
   an operation input unit configured to input an operation of a user regarding conflict resolution judgment; and
   a conflict resolution unit configured to update at least one of the pieces of editing result information, the update based on the input into the operation input unit, and update the display by the conflict display unit.

3. The signal processing device according to claim 2, wherein:
   the conflict resolution unit is further configured to set at least one of the pieces of editing result information as basic editing result information, and automatically update the editing result information with priority on the basic editing result information.

4. The signal processing device according to claim 2, wherein:
   the conflict resolution unit is configured to automatically update the editing result information based on elements overlapping among the pieces of editing result information.

5. The signal processing device according to claim 1, further comprising:
   a material database configured to hold one or more sets of signal data and one or more material IDs, the material IDs identifying the associations between the one or more sets of signal data, and
   each piece of editing result information is a playlist including the one or more material IDs and a reproduction duration, each playlist formed by a reproduction element, and the reproduction duration is a duration in which the one or more material IDs would be reproduced.

6. The signal processing device according to claim 5, wherein:
   the operating unit further includes an editing unit configured to edit the editing result information based on an input by a user, and
   the conflict resolution unit is configured to update the editing result information in the editing database every time an editing operation of the editing unit is executed.

7. The signal processing device according to claim 5, wherein:
   the conflict detection unit is further configured to detect matching values among corresponding reproduction elements in different playlists, and detect overlapping among corresponding reproduction elements in the different playlists.

* * * * *